April 2, 1963 F. O. OTTOSEN ET AL 3,083,457
HEDGE TRIMMER
Filed May 3, 1961 4 Sheets-Sheet 1
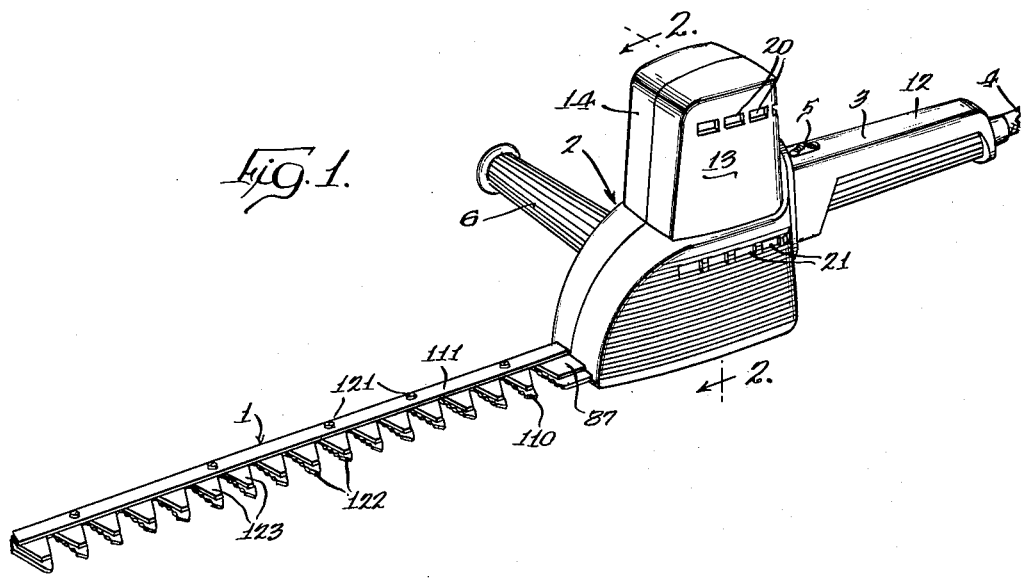
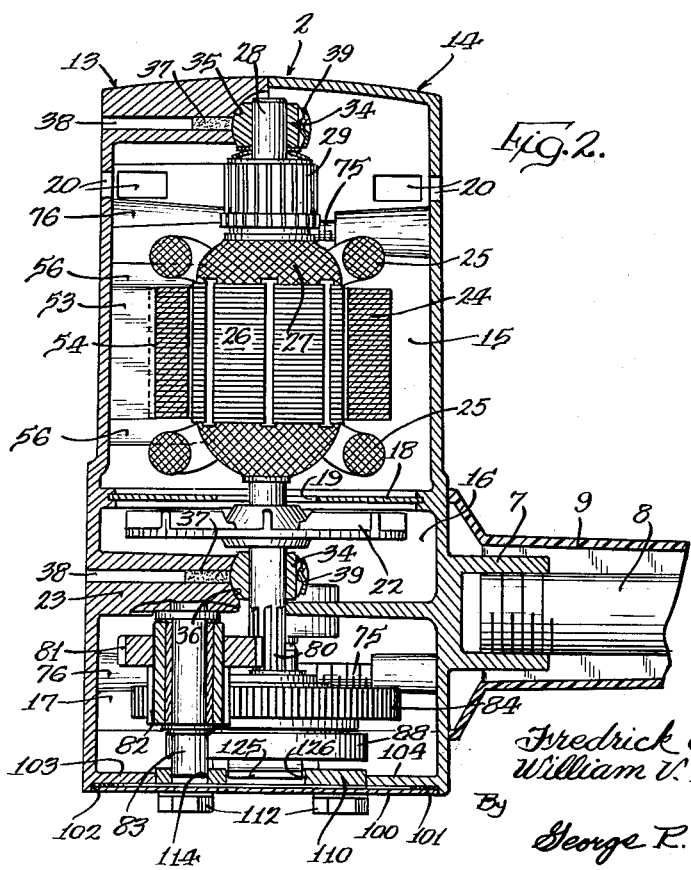
INVENTORS:
Fredrick O. Ottosen
William V. Kalnins
By George R. Clark
Atty

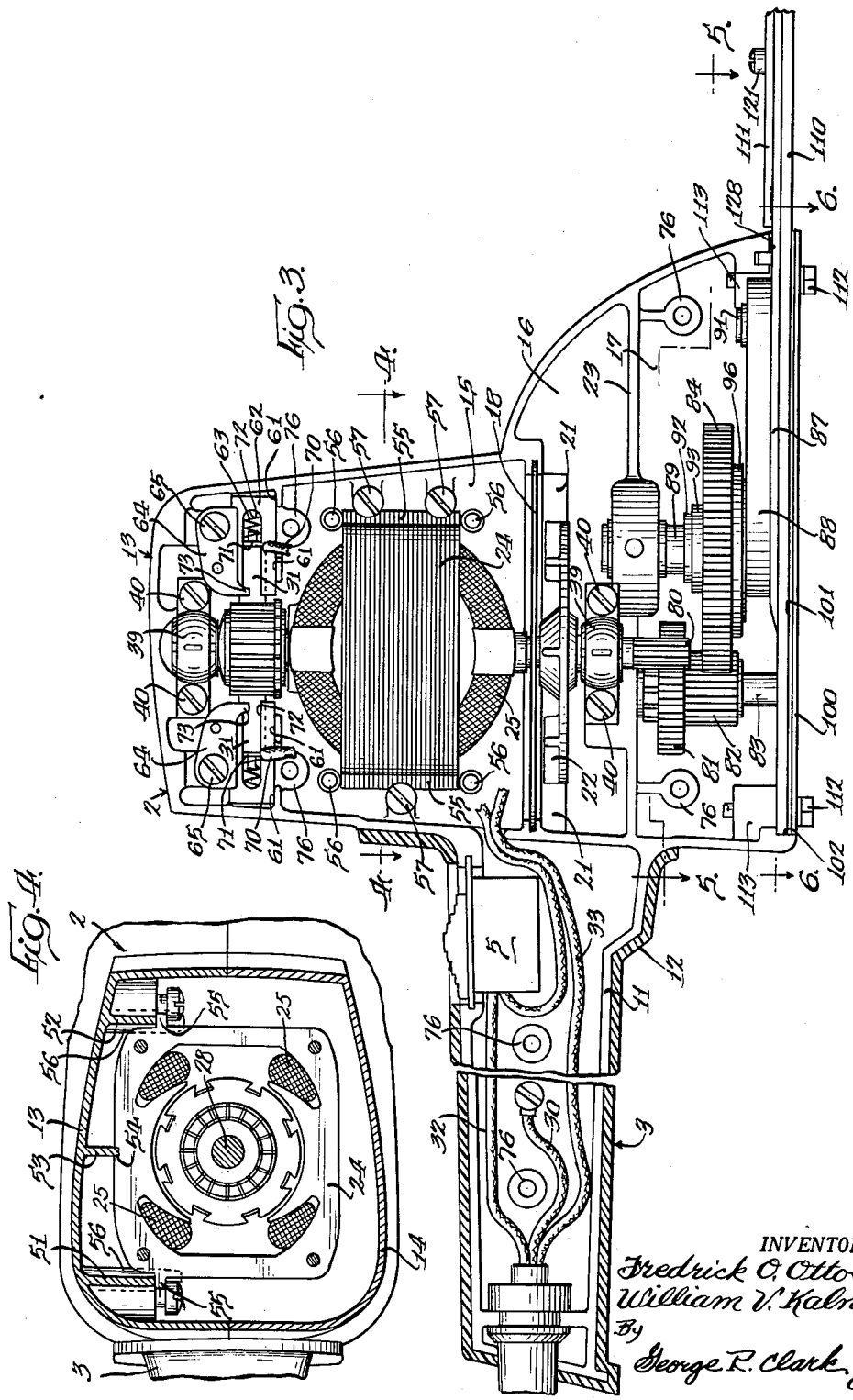

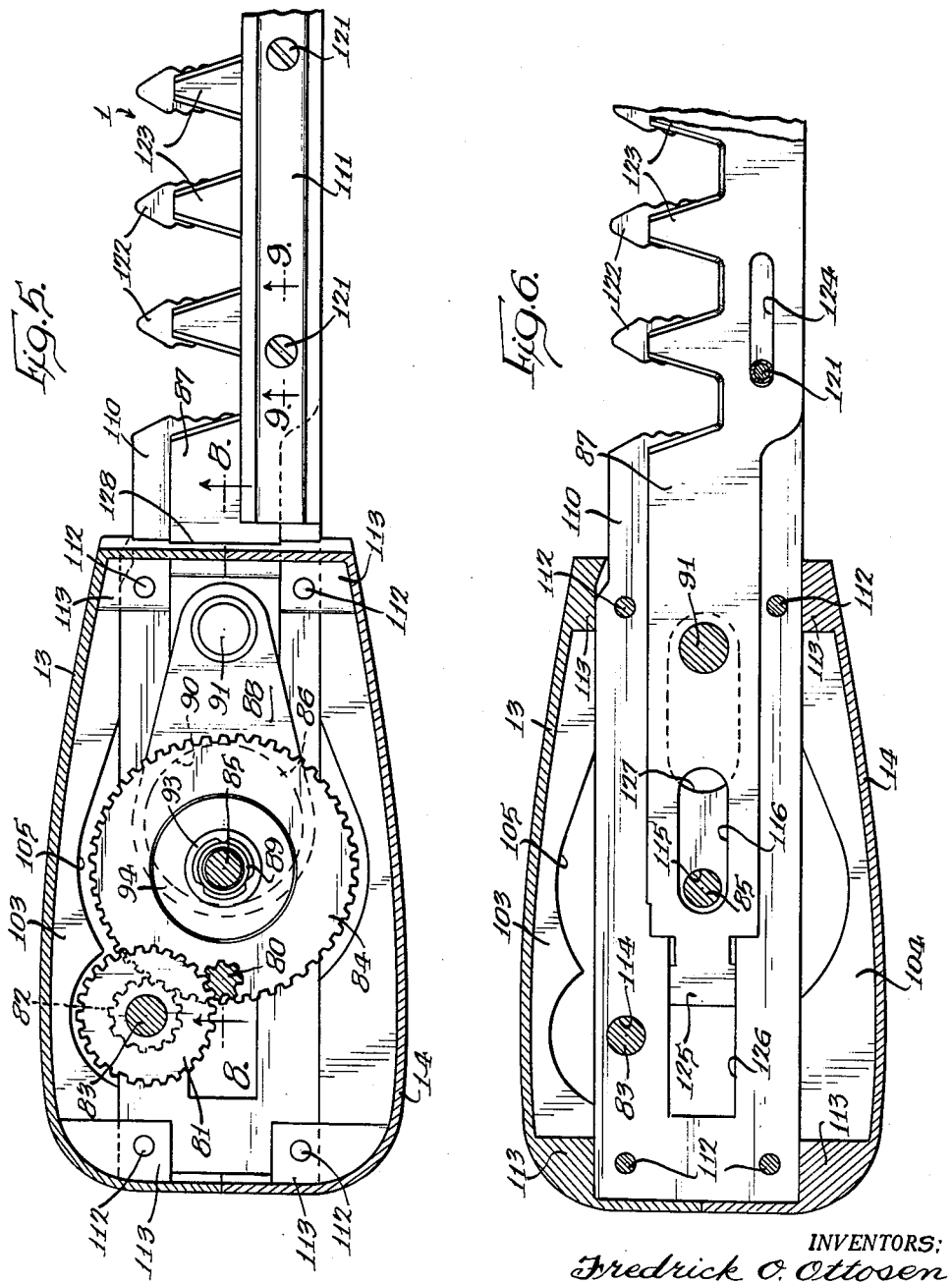

April 2, 1963   F. O. OTTOSEN ET AL   3,083,457
HEDGE TRIMMER
Filed May 3, 1961                       4 Sheets-Sheet 4
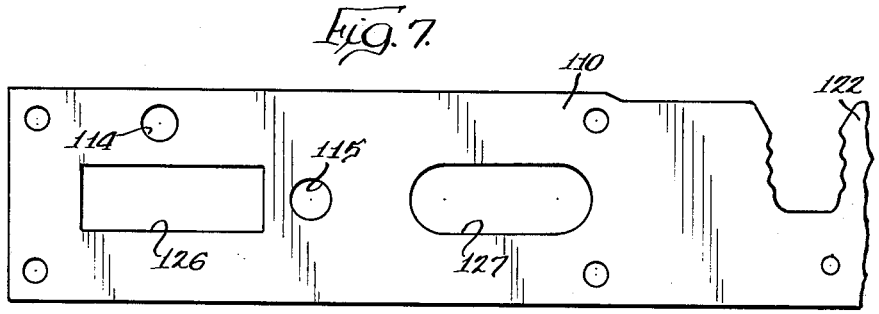
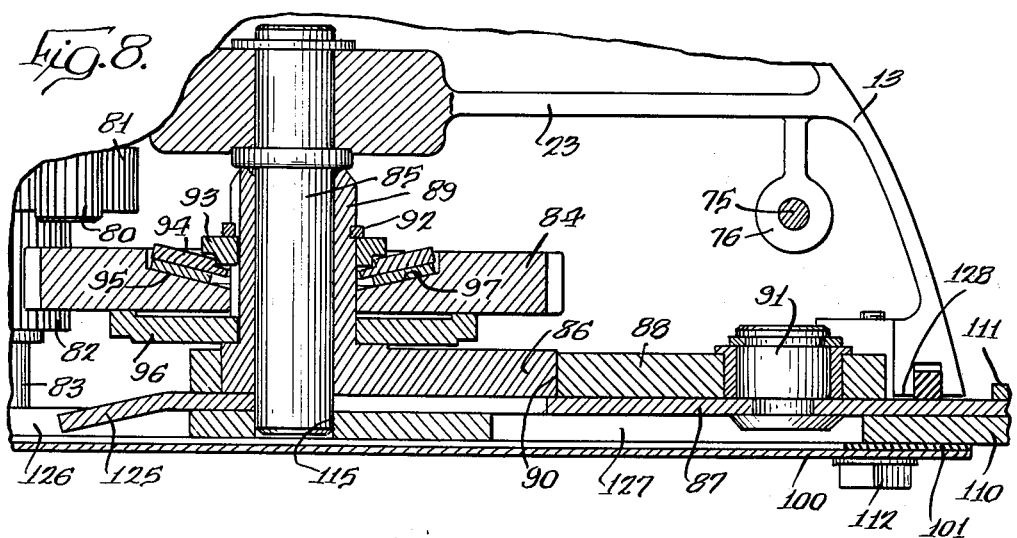
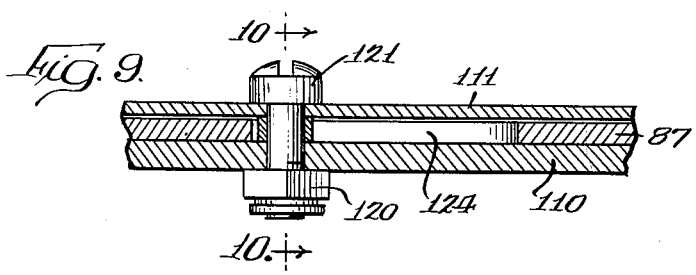
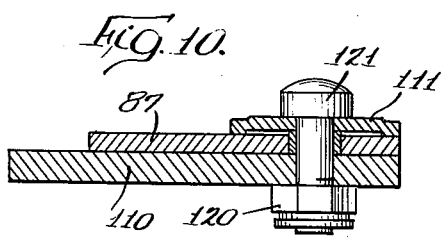
INVENTORS:
Fredrick O. Ottosen
William V. Kalnins
By
George R. Clark, Atty 3,083,457
HEDGE TRIMMER
Frederick O. Ottosen, Chicago, and William V. Kalnins, Oak Park, Ill., assignors to Sunbeam Corporation, Chicago, Ill., a corporation of Illinois
Filed May 3, 1961, Ser. No. 107,376
18 Claims. (Cl. 30—216)

This invention relates to an improved hedge trimmer, and more particularly, to an improved hand held type of hedge trimmer or clipper.

One object of the invention is to provide a powerful yet lightweight and well balanced hand held type of hedge trimmer.

A further object of the invention is to provide a hedge trimmer which has its various parts assembled so as to facilitate inspection and repair or servicing.

Another object of the invention is to provide hedge trimmers with improved motor-to-cutter speed reduction and drive connecting means.

A further object of the invention is to provide an improved cutter and comb assembly mounting and positioning means.

A yet further object of the invention is to fulfill the above-stated objects in a hedge trimmer which is low cost.

In prior art hedge trimmers it is well known to position the motor in the horizontal and rearwardly extending handle of the device. Such location of the motor is satisfactory when the motor is a small one. However, if the power of the hedge trimmer is to be increased, a larger motor is required and positioning the same in the handle has disadvantages. For instance, the larger motor increases the dimensions of the handle so that it no longer affords a convenient means of holding the hedge trimmer. Furthermore, the larger motor generates larger quantities of heat which are more difficult to dissipate through the handle.

In prior art hedge trimmers it is also well known to provide removable closure plates and the like for parts of the casing so as to be able to inspect and service the internal parts. However, these prior art removable closure members have not been adequate in that they do not permit opening of the casing to a sufficient degree to adequately perform a full inspection of the parts when in their working position. That is to say, in the prior art in order to be able to inspect all of the internal mechanism it is necessary to disassemble a substantial part thereof besides merely removing the closure members.

It is also well known in the prior art to use speed reduction means between the motor and the cutter. Some of the speed reduction means take the form of a worm and a worm gear. Such speed reduction means has the disadvantage that it is relatively inefficient and quick wearing. Spur gears have also been used as a speed reduction means in hedge trimmers. Spur gears are more efficient and longer wearing than worms and worm gears. However, in both forms of speed reduction means, it has been found necessary to provide special bearing supports for opposite ends of the shafts thereof which results in an increase in the number of necessary parts and the cost of the hedge trimmer. Besides this, means must also be provided to properly align and maintain the position of the cutter and comb assembly with respect to the motor-to-cutter speed reduction and connecting means.

In the preferred form of the invention the several disadvantages of the prior art are overcome by positioning the motor vertically in the casing in front of a rearwardly extending handle. This does not require an increase in the dimensions of the handle or interfere with proper cooling of the motor. The casing is preferably constructed from a lightweight material and this and the vertical disposition of the motor provides a hedge trimmer which is powerful yet lightweight and well balanced. The casing, which includes the rearwardly extending handle is lengthwise split into two halves. All of the internal working mechanism is carried by and mounted in one of the casing halves whereas the other casing half serves primarily as a cover member. This means that all of the internal working parts of the hedge trimmer are fully exposed for inspection and servicing or repair by mere removal of the casing half which serves as a cover. The arrangement is such that the motor for instance, can be energized and operated in its normal working position with the casing completely open. In the invention, the speed reduction means comprises spur gears and includes an improved slip clutch. A slip clutch is provided so as to prevent high impact on the gears should the hedge clipper motor become overloaded as in cutting twigs and the like. The bottom part of the casing forward of the handle is open. The cutter and comb assembly is bolted to the casing adjacent this opening for drive connection with the speed reduction means. However, in the invention the ends of the shafts for the speed reduction means extend into apertures formed in the comb of the comb and cutter assembly. In this manner, the shafts serve as aligning means for the comb and cutter assembly, and the comb serves as bearing means for the ends of the shafts. This form of cooperative relationship between the comb and cutter assembly and the speed reduction means makes it possible to reduce the number of necessary parts, and this is one aspect of the invention which contributes to the attainment of a hedge trimmer which is low cost.

The features of the invention which are believed to be novel are set forth with particularity in the appended claims. The invention itself however, both as to its organization and operation, together with further objects and advantages thereof, may best be understood by reference to the following description taken in connection with the accompanying drawings.

In the drawings,

FIG. 1 is a perspective view of one form of the invention;

FIG. 2 is an enlarged sectional view taken along the section line 2—2 of FIG. 1;

FIG. 3 is an enlarged side view of the device with the cover half of the casing removed;

FIGS. 4, 5 and 6 are sectional views taken along the lines 4—4, 5—5 and 6—6 respectively of FIG. 3;

FIG. 7 is a plan view of the comb plate;

FIGS. 8 and 9 are sectional views taken along the lines 8—8 and 9—9 respectively of FIG. 5, with FIGS. 8 and 9 being shown in enlarged scale; and FIG. 10 is a sectional view taken along the line 10—10 of FIG. 9.

Referring first to FIG. 1, the hedge trimmer illustrated in the drawings comprises a forwardly located comb and cutter assembly 1, a motor and speed reduction housing 2 constructed from a lightweight material such as aluminum, a rearwardly extending handle 3, and a connector cord 4 extending from handle 3. An on-off switch 5 is provided on handle 3 for controlling the hedge trimmer when connector cord 4 is connected to a source of electrical energy. A side handle 6 is provided on housing 2. The weight and balance of the hedge clipper is such that it can be conveniently held merely from the handle 3. However, the handle 6 is an auxiliary handle or support. Handle 6 is placed on the opposite side of housing 2 from the teeth of the comb and cutter assembly for safety reasons. This side of the housing has an internally threaded boss 7 formed thereon as best shown in FIG. 2. The handle 6 comprises an internal metallic tube 8 and an outer plastic sheath 9. The inner end of tube 8 is externally threaded whereby the handle 6 can be connected to the boss 7.

Referring also to FIG. 3, the handle 3 comprises an inner metallic tubular member 11 and an outer plastic sheath 12. The inner tubular member 11 is an integral portion of the motor and speed reduction means housing 2. The housing 2 is split lengthwise thereof into halves. The half 13 is designated the main half inasmuch as it provides the mounting or support for the internal mechanism, whereas half 14 serves primarily as a closure or cover member for the half 13. The housing 2 generally speaking is divided into three chambers comprising an electric motor chamber 15, a fan chamber 16, and a speed reduction means chamber 17. The chambers 15 and 16 are separated from each other by a baffle member 18. Member 18 has a central aperture 19 formed therein. Inlet air openings 20 are formed in the upper end of housing 2 and outlet air openings 21 are formed in the side walls of chamber 16. A fan member 22 in chamber 16 causes air to be drawn in through openings 20 across the motor and chamber 15 and then through the aperture 19 into the chamber 16 and out of the openings 21.

The chambers 16 and 17 are separated from each other by a partition member 23 which comprises an integral portion of the casing halves 13 and 14. The partition 23 provides support for the lower end of the motor shaft and support for the upper ends of the shafts of the speed reduction means in a manner which will be described in detail hereinafter.

The electric motor in chamber 15 comprises a motor field which includes a stator or core 24 and stator or core windings 25. The core 24 is hollow and disposed therein is an armature including an armature core 26 and armature windings 27. The armature is carried on a shaft 28 which also supports a commutator 29.

The lead 30 in handle 3 is a ground conductor to ground the device in the event of a short circuit. The elements 31 are commutator brushes, and the conductors 32 and 33 in handle 3 are electrical leads for energizing the electric motor through the switch 5 in a manner which will be obvious to those skilled in the art. The electric motor is operative on either alternating or direct current.

The opposite ends of shaft 28 for the electric motor are supported in a pair of bearings 34. Upper bearing 34 is adapted to be seated in a recessed surface 35 formed adjacent the upper end of housing 2. The lower bearing 34 is seated in a similar surface 36 formed in an integral portion of the partition 23. Each of surfaces 35 and 36 has a cavity formed therein for receiving an oil wick 37 or the like to provide lubrication for the bearings 34 on the opposite ends of shaft 28. Oil conduits 38 are formed in casing part 13 which lead to the oil wicks 37. The bearings 34 are retained in their seating surfaces 35 and 36 by bearing retainers 39 which are held in place by means such as studs 40. The upper bearing retainer is bolted by studs 40 to integral portions of casing half 13 adjacent to the surface 35, and the lower bearing retainer is bolted by its studs to integral portions of partition 23 formed adjacent to the lower bearing surface 36. In this manner, the main casing half 13 provides a means for mounting and properly aligning the motor shaft 28 and its structure such as armature core 26, armature windings 27 and commutator 29.

The casing half 13 also has means for mounting and properly positioning the field core 24 therein. Said means comprises (see also FIG. 4) a left-hand ledge 51, a right-hand ledge 52, and a central ledge 53. The back of the stator 24 has a notch 54 formed therein which receives the ledge 53. A pair of shoulders 55 are formed on opposite sides of stator 24 adjacent those corners thereof which are positioned near the ledges 51 and 52. The shoulders 55 rest on the ledges 51 and 52. In this manner the stator 24 is kept from shifting in a direction lengthwise of the hedge trimmer. The stator 24 is properly positioned in an up and down position by lugs 56 formed at opposite ends of the ledges 51 and 52. Stator 24 is bolted in position by means such as studs 57. One stud is provided adjacent the ledge 51 and two are provided adjacent the ledge 52. The heads of studs 57 engage the shoulders 55 to clamp the stator 24 in its illustrated position as determined by the aligning means 51 to 56.

The commutator brushes 31, which may be constructed from carbon, are also mounted in and aligned by integral portions of the main casing half 13. Four ledges 61 are formed on opposite sides of the commutator 29 in casing half 13. Each set of four ledges 61 receives a commutator brush holder 62. The commutator brushes 31 are mounted in the holders 62 and are urged in an outward direction by springs 63 disposed in the holder 62. The holders 62 are clamped in their seated positions on the ledges 61 by retaining elements 64 which are clamped to integral portions of housing half 13 by means such as studs 65.

An electrical connection is made with the commutator brushes by leads 70 which have terminals 71 connected thereto which are disposed inside the holders 62. The holders 62 have a lengthwise extending slot 72 formed therein through which the terminals 71 extend. Due to the enlarged ends of terminals 71 they will not come out of the slot 72. After the commutator brushes 31 have become worn, the spring 63 will not urge the terminals 71 into contact with the commutator 29 inasmuch as integral portions 73 which are formed on the retainers 64 overhang the slots 72 so as to retain the terminals 71 inside the brush holders.

Inasmuch as all the electric motor parts are mounted in the casing half 13 the electric motor can be viewed in operating condition even though the casing half 14 is removed. The casing half 14 is bolted to the casing half 13 by means such as studs 75 which extend through apertures formed in casing part 14 into tapped bosses 76 formed in the casing part 13. Two such bosses are formed in the handle 3, another two in the chamber 15 just below the brush holders 62, and another two in chamber 17 just below the partition 23.

The speed reduction means contained in chamber 17 will now be described. The lower end of shaft 28 extends through an aperture formed in partition 23, and at its lower end has a pinion 80 formed thereon. Pinion 80 meshes with a spur gear 81. Gear 81 is keyed to a gear 82. Gear 82 is rotatably mounted on a shaft 83. Shaft 83 is supported at its upper end in partition 23. Thus, rotation of pinion 80 causes rotation of gear 81 which in turn causes rotation of gear 82.

Gear 82 meshes with a spur gear 84. Gear 84 is rotatably mounted on a shaft 85 (see FIG. 8) and is adapted to rotate an eccentric 86 through a slip clutch mechanism which will be described shortly. Eccentric 86 is connected to a reciprocating cutter blade 87 by a connecting element 88.

Eccentric 86 is integrally connected to a hollow shaft 89 which is rotatably mounted on shaft 85. The upper end of shaft 85 is supported in the partition 23. The eccentric 86 is eccentrically disposed with respect to the tubular shaft 89. The eccentric 86 has a circular form and fits in and rotates within a circular aperture 90 formed in the left-hand end of connecting element 88. The right-hand end of connecting element 88 is pivotally connected to the reciprocable cutting element 87 by pin means 91 or the like.

The spur gear 84 is freely rotatably and axially movably mounted on the hollow shaft 89 and is adapted to rotate shaft 89 through a slip clutch mechanism comprising five annular circular elements 92, 93, 94, 95 and 96. Element 92 is an axially immovable split lock washer, element 93 is a pressure washer which causes deformation of element 94 which is a resilient clutch disk. Element 95 is a friction clutch facing, and element 96 is a separating washer between gear 84 and eccentric 86.

The elements 93 and 96 are keyed on the hollow shaft 89 for axial movement but against relative rotation with respect thereto whereas elements 94 and 95 are freely rotatable and axially movable with respect to hollow shaft 89. The element 93 deforms element 94 into a cone shape and deformed element 94 resiliently biases the friction facing 95 into contact with a cone-shaped friction surface 97 formed on spur gear 84. Accordingly, elements 94 and 95 cause spur gear 84 to rotate the eccentric 86 through the elements 93 and 96. The elements 93 and 94 are keyed with respect to each other by engaged hexagonal-shaped shoulders formed on the lower and upper sides thereof respectively. Should the cutting element 87 be overloaded the spur gear 84 will slip relative to the eccentric 86 so that high impact forces are not imposed on the gears.

The lower part of chamber 17 is open and is adapted to be closed by closure means comprising a cover plate 100 and a sealing gasket 101. The two elements 100 and 101 are adapted to be seated within a shoulder 102 which is formed on the periphery of the casing halves 13 and 14. Ledges 103 and 104 formed inwardly of the shoulder 102 on the casing halves 13 and 14, respectively, define an opening 105 through which the spur gear assembly can be viewed when the cover plate 100 and the cutter and comb assembly is removed.

The comb and cutter assembly comprises cutter 87, a comb 110, a cutter blade retainer 111, and the connecting element 88 and connecting means 91. That is to say, the elements 87, 88, 91, 110 and 111 are removable as a unitary assembly from with respect to the speed reduction means including the slip clutch and eccentric 86 upon removal of the cover 100. The cover 100 is bolted to the casing halves by means such as studs 112 which enter tapped ledges 113. The ledges 113 are slightly deeper than the ledges 103 and 104 and comprise means for seating the comb and cutter assembly within the bottom of the casing halves.

In the invention the upper ends of the shafts 83 and 85 of the spur gear assembly are supported within the partition 23. The comb member 110 provides means for supporting the lower ends of the shafts 83 and 85. This is accomplished by forming an aperture 114 in the comb 110 for the shaft 83, and an aperture 115 for the shaft 85. The shaft 85 clears the reciprocating cutter element 87 by virtue of an elongated slot 116 formed in cutter element 87. The comb 110 is seated on the ledges 113 and within the marginal edges of the ledges 103 and 104 and is bolted thereto by the cover plate 100 and studs 112. Accordingly, the comb 110 forms a rigid support for the outer ends of shafts 83 and 85. At the same time, the shafts 83 and 85 perform the function of determining the proper alignment of the comb and cutter assembly inasmuch as they enter the apertures 114 and 115 of the comb. This feature of the invention makes it unnecessary to provide special outer end supports for the shafts of the spur gear assembly.

The reciprocating cutter element 87 is disposed between the comb 110 and the cutter retaining element 111. Element 111 is connected to the comb 110 by a plurality of nuts and bolts 120 and 121 or the like. The bolts 121 extend through aligned apertures formed in the elements 110 and 111. The element 111 has a shallow U-shaped cross section so that when the nuts 120 are tightened the element 111 resiliently biases the cutting blade 87 into contact with the comb 110.

The comb 110 has a plurality of comb teeth 122 formed thereon which cooperate with a plurality of cutting teeth 123 formed on the cutter 87. The side edges of the teeth 122 are undulated or scalloped for improved cutting action with the side edges of the teeth 123. The cutter 87 has a plurality of spaced elongated slots 124 formed therein through which the bolts 121 pass. The bolts may have rollers thereon within the slots 124. In this manner the cutter 87 is free to slide back and forth between the elements 110 and 111 in guided straight line fashion. The cutter blade is free to slide in and out of the front end of casing 2 by virtue of clearance 128 provided therefor.

At its inner end the cutter 87 extends between the comb 110 and the connecting link 88 and eccentric 86. The extreme left-hand end of cutter 87 (see FIG. 8) has an outwardly turned portion 125 which is disposed within a slot 126 formed in the left-hand end of comb 110. This turned portion 125 is free to slide back and forth in slot 126 and provides a guide for the left-hand end of the cutter 87 as it reciprocates back and forth. An elongated slot 127 is also formed in comb 110 to provide clearance for the connecting means 91 which connects the connecting element 88 to the cutter 87.

It will now be obvious that the various parts of the hedge trimmer are ideally located and correlated with respect to each other to facilitate inspection and servicing or maintenance. For instance, oil can be provided for the electric motor bearings through the oil conduit 38. Grease can be applied to the speed reduction means in chamber 17 merely by removing the four studs 112 and the cover plate 110 and the comb and cutter assembly to provide access to chamber 117 through the opening 105. With the opening 105 uncovered the spur gear assembly including the eccentric 86 can be readily observed in working condition. The same procedure is used for servicing the comb and cutter assembly. For instance, if it is desired to sharpen the comb and cutter, these two parts can be removed merely by removing the studs 112.

It is not necessary to remove the cover plate 100 and the comb and cutter assembly in order to observe the internal working parts within the chambers 15, 16 and 17. For instance, only the two studs 112 connected to the casing half 14 need be removed. This will leave the cover member 100 and the comb and cutter assembly intact in operating position. Removal of the six casing studs 75 will permit removal of the casing half 14. Thus, casing half 14 serves essentially as a cover member for the main housing portion of the hedge trimmer which comprises the main casing half 13 and the cover plate 100. With the casing half 14 removed all of the working parts of the hedge trimmer remain in their assembled position. Accordingly, the hedge trimmer can be inspected while it is energized. This is because all of the internal mechanism of the hedge trimmer is mounted or supported in the main enclosure comprising the casing half 13 and the cover plate 100. If it is necessary to perform maintenance such as renewing the carbon brushes 31, it is only necessary to remove the casing half 14. The brushes 31 can be renewed by unscrewing the studs 65 so that the brush holders 62 can be removed from their seated position. After the new brushes are put in the brush holders 62 are returned to their seated position and clamped in seated position by bolting the retainers 64 to the casing half 13 with studs 65.

In removing the casing half 14 from with respect to the casing half 13, the plastic sheath 12 for handle 3 must be withdrawn from the integral handle portion 11 of the hedge trimmer. This is readily accomplished by merely sliding sheath 12 off the member 11. After the two casing halves 13 and 14 are bolted together the sheath 12 can be slid back into place on the handle 3.

While there has been shown and described a particular embodiment of the invention, it will be obvious to those skilled in the art that changes and modifications may be made without departing from the invention, and therefore it is intended by the appended claims to cover all such changes and modifications as fall within the true spirit and scope of the invention.

What is claimed as new and desired to be secured by Letters Patent of the United States is:

1. In a hedge trimmer comprising an electric motor, speed reduction means for said motor, a comb and cutter assembly, means interconnecting said speed reduction means and assembly in drive relationship, and a housing for said motor, speed reduction means, assembly and interconnecting means; said housing comprising a split casing, one part of said split casing comprising a cover for the remainder of said split casing, said casing remainder having means for mounting said motor, speed reduction means, assembly and interconnecting means therein in operative working relationship independent of said one casing part, said motor and speed reduction means being mounted in said casing remainder independently of each other, and said one casing part being removable from with respect to said casing remainder to expose said motor, speed reduction means, assembly and interconnecting means in operative working relationship.

2. In a hedge trimmer as in claim 1, wherein said split casing has a main portion which has an opening formed therein and a cover member for said opening; said main portion being split lengthwise thereof into casing halves, and detachable means interconnecting said casing halves and cover member together for removal of one casing half from with respect to the other casing half and said cover member without removing said cover member and said other casing half from with respect to each other.

3. In a hedge trimmer comprising an electric motor, speed reduction means for said motor, a comb and cutter assembly, means interconnecting said speed reduction means and assembly in drive relationship, and a housing for said motor, speed reduction means, assembly and interconnecting means; said housing comprising a split casing, one part of said split casing comprising a cover for the remainder of said split casing, said casing remainder having means for mounting said motor, speed reduction means, assembly and interconnecting means therein in operative working relationship independent of said one casing part, and said one casing part being removable from with respect to said casing remainder to expose said motor, speed reduction means, assembly and interconnecting means in operative working relationship, said comb and cutter assembly comprise a stationary comb and a movable cutter projecting from within said housing, said speed reduction means comprising speed reduction gears and shafts for rotatably supporting said gears, said shafts being supported at one of their ends in support means formed in said casing remainder, and said shafts being supported at their other ends in support means formed in said stationary comb.

4. In a hedge trimmer comprising an electric motor, speed reduction means for said motor, a comb and cutter assembly, means interconnecting said speed reduction means and assembly in drive relationship, and a housing for said motor, speed reduction means, assembly and interconnecting means; said housing comprising a split casing, one part of said split casing comprising a cover for the remainder of said split casing, said casing remainder having means for mounting said motor, speed reduction means, assembly and interconnecting means therein in operative working relationship independent of said one casing part, and said one casing part being removable from with respect to said casing remainder to expose said motor, speed reduction means, assembly and interconnecting means in operative working relationship, said split casing having a main portion which has an opening formed therein and a cover member for said opening; said main portion being split lengthwise thereof into casing halves, and detachable means interconnecting said casing halves and cover member together for removal of one casing half from with respect to the other casing half and said cover member without removing said cover member and said other casing half from with respect to each other, said comb and cutter assembly comprise a stationary comb and a movable cutter projecting from within said housing, said speed reduction means comprising speed reduction gears and shafts for rotatably supporting said gears, said shafts being supported at their inner ends in support means formed in said other casing half, and said shafts being supported at their outer ends in support means formed in said stationary comb, and said detachable means connecting said comb and cutter assembly and said cover member to said casing halves for removal of said assembly and cover member from wtih respect to said casing halves to expose said speed reduction means through said opening without removal of said casing halves from with respect to each other.

5. In a power driven hedge trimmer comprising a housing having speed reduction means therein for driving the cutter of a stationary comb and movable cutter assembly, the comb of said assembly having its inner end mounted in said housing, said speed reduction means comprising gears and shafts for rotatably supporting said gears, said shafts being supported at one of their ends by support means formed in said housing, and the other ends of said shafts being supported by means formed in said comb, and said shafts and said last-mentioned means comprising means for determining the proper alignment of said comb and cutter assembly with respect to said speed reduction means.

6. In a power driven hedge trimmer comprising a housing having a speed reduction gear chamber formed therein and gears and gear supporting shafts disposed in said chamber, an opening in said chamber to expose said gears to inspection, a stationary comb and movable cutter assembly driven by said gears, said assembly being supported on said housing in superposed relationship with respect to said opening, said shafts being supported at their inner ends by integral portions of said housing, means formed in the stationary comb of said assembly for supporting the outer ends of said shafts, and a cover member for said assembly and opening, and detachable means fixing said cover member and comb to said housing.

7. In a hedge trimmer, a casing having a vertically disposed main portion and a rearwardly extending integral handle, a horizontally disposed comb and cutter assembly projecting forwardly from within the bottom of said main portion, said bottom having speed reduction means therein for driving the cutter of said assembly, and a vertically disposed motor in said casing above said speed reduction means for driving the same, said main portion and handle being split lengthwise thereof into casing halves, one of said casing halves supporting said motor and speed reduction means therein independently of the other casing half, and said other casing half comprising essentially a cover for said one casing half.

8. In a hedge trimmer as in claim 7, wherein said main portion is divided into an upper motor chamber and a lower speed reduction means chamber by an integral wall partition of said casing halves, and support means formed in said one casing half for said motor and said speed reduction means in said wall partition whereby said motor and speed reduction means can be operated independent of removal of said cover.

9. In a hedge trimmer having internal working mechanism comprising an electric motor, a blower for cooling said motor, speed reduction means for said motor, a stationary comb and movable cutter assembly, and means for driving the cutter of said assembly from said speed reduction means, said driving means including a slip clutch; a casing for housing said internal working mechanism, said casing being split for removal of one part thereof with respect to the remainder thereof to view said internal working mechanism, and support means formed solely in said casing remainder for said internal working mechanism for inspection of the same in operative condition regardless of removal of said one casing part.

10. In a power driven hedge trimmer comprising an electric motor and speed reduction means for said motor, an open split housing for said motor and speed reduction means, and closure means for closing said open housing and connecting a comb and cutter assembly in drive relationship with respect to said speed reduction means, said closure means being removable from with respect to said split housing to expose said speed reduction means and remove said assembly independent of separation of said split housing, and one of the parts of said split housing being removable therefrom to expose said motor and speed reduction means and assembly independent of separation of said closure member and assembly.

11. A hedge trimmer, comprising a housing, said housing having a generally vertically disposed hollow portion and a generally horizontally disposed hollow portion, the second-mentioned hollow portion being integral with the first-mentioned hollow portion and said integral hollow portions being split lengthwise thereof into two complementary housing sections, said second-mentioned hollow portion comprising a handle grip for the hedge trimmer, said handle grip being elongated and extending rearwardly from generally the central portion of the rear of said first-mentioned hollow portion, an elongated stationary comb and movable cutter blade assembly connected to the bottom of said first-mentioned hollow portion and projecting forwardly therefrom, a vertically disposed motor in said first-mentioned hollow portion, and means in said first-mentioned hollow portion for connecting said motor and movable cutter blade in drive relationship.

12. In a hedge trimmer as in claim 11, wherein said last-mentioned means comprises a spur gear assembly, integral internal wall portions of said housing dividing the interior thereof into an upper motor chamber and a lower spur gear assembly chamber, said spur gear assembly comprising a plurality of spur gears and a plurality of vertically disposed shafts for supporting said spur gears, and the lower end of the shaft of the motor and the upper end of each of the shafts for the spur gears being supported in said integral internal wall portions.

13. In a hedge trimmer comprising a housing, said housing having a generally vertically disposed hollow portion and a generally horizontally disposed hollow portion, the second-mentioned hollow portion being integral with the first-mentioned hollow portion and comprising a handle grip for the hedge trimmer, said handle grip being elongated and extending rearwardly from generally the central portion of the rear of said first-mentioned hollow portion, an elongated stationary comb and movable cutter blade assembly connected to the bottom of said first-mentioned hollow portion and projecting forwardly therefrom, a vertically disposed motor in said first-mentioned hollow portion, means in said first-mentioned hollow portion for connecting said motor and movable cutter blade in drive relationship, said last-mentioned means comprising a spur gear assembly, integral internal wall portions of said housing dividing the interior thereof into an upper motor chamber and a lower spur gear assembly chamber, said spur gear assembly comprising a plurality of spur gears and a plurality of vertically disposed shafts for supporting said spur gears, the lower end of the shaft of the motor and the upper end of each of the shafts of the spur gears being supported in said integral internal wall portions, and the lower end of each of the shafts for the spur gears being supported in apertures formed in the stationary comb of the comb and cutter blade assembly.

14. In a hedge trimmer, a casing, a stationary comb and movable cutter blade assembly connected to the casing, a spur gear assembly in said casing comprising a plurality of spur gears and shafts therefor, one of the ends of each of the shafts of the spur gear assembly being supported in apertures formed in the comb of the comb and cutter blade assembly, and means for connecting said spur gear assembly and the blade of the comb and cutter blade assembly in drive relationship comprising a tubular member having an integral circular eccentric, said tubular member being positioned on one of the shafts of the spur gear assembly, one of the spur gears of the spur gear assembly being rotatably mounted on said tubular member, a clutch on said tubular member for connecting said one spur gear and tubular member in drive relationship, and a connecting element connecting said eccentric with said blade.

15. A drive mechanism for a reciprocable cutter blade of a hedge trimmer, said mechanism comprising a shaft, a rotary tube on said shaft, a circular eccentric integral with said tube, a rotary drive gear on said tube, an annular clutch on said tube for connecting said tube and gear in drive relationship, and a connecting member which is adapted to be pivotally connected at one of its ends to said cutter blade, the other end of said connecting member being apertured and receiving said eccentric therein.

16. In a drive mechanism as in claim 15, wherein said annular clutch comprises an annular separating member keyed on said tube between said gear and eccentric, an annular pressure member keyed to said tube along an opposite side of said gear, an annular clutch plate on said tube between said pressure member and gear for making frictional engagement with said opposite side of said gear, said clutch plate being keyed to said pressure member.

17. In a hedge trimmer comprising a motor, a movable cutter, and speed reduction means interconnecting the motor and cutter in drive relationship, said speed reduction means comprising a plural stage speed reducing gear train, and the last gear of said gear train being connected to said cutter by a slip clutch.

18. In a hedge trimmer as in claim 17, wherein said motor comprises a rotary motor, said movable cutter comprises a reciprocated cutter blade, and said gear train comprises a plurality of spur gears, means being provided between said last gear and cutter blade for converting rotary motion into reciprocating motion, said motion converting means including a rotatably mounted drive member, said last gear being rotatably mounted on said drive member, and said slip clutch being annular-shaped and being disposed between said last gear and drive member.

References Cited in the file of this patent
UNITED STATES PATENTS

| | | |
|---|---|---|
| 1,525,826 | Perlman | Feb. 10, 1925 |
| 1,974,557 | Andis | Sept. 25, 1934 |
| 2,108,569 | Togami | Feb. 15, 1938 |